US006653843B2

(12) United States Patent
Whitchurch

(10) Patent No.: US 6,653,843 B2
(45) Date of Patent: Nov. 25, 2003

(54) BATTERY ACID LEVEL ALARM

(75) Inventor: Norton W. Whitchurch, Inverness, FL (US)

(73) Assignee: Pacer Engineered Systems, Inc., Minneapolis, MN (US)

(*) Notice: Subject to any disclaimer, the term of this patent is extended or adjusted under 35 U.S.C. 154(b) by 17 days.

(21) Appl. No.: 10/092,042

(22) Filed: Mar. 5, 2002

(65) Prior Publication Data

US 2002/0125889 A1 Sep. 12, 2002

Related U.S. Application Data

(60) Provisional application No. 60/274,316, filed on Mar. 8, 2001.

(51) Int. Cl.$^7$ .............................................. G01N 27/02
(52) U.S. Cl. ....................................... 324/446; 324/429
(58) Field of Search ................................. 324/446, 440, 324/444, 445, 439, 429, 425, 430, 432, 433, 437, 636

(56) References Cited

U.S. PATENT DOCUMENTS

| 1,594,814 | A | 8/1926 | Brodin et al. ................. 702/63 |
| 2,779,015 | A | 1/1957 | Walker et al. ................. 320/134 |
| 2,792,567 | A | 5/1957 | Schultz ........................ 324/430 |
| 3,314,060 | A | 4/1967 | MacKenzie et al. .......... 429/228 |
| 3,321,754 | A | 5/1967 | Grimm et al. ................ 320/126 |
| 3,343,152 | A | 9/1967 | Hart ............................ 429/89 |
| 3,349,386 | A | 10/1967 | Zug ............................. 340/636 |
| 3,366,943 | A | 1/1968 | Hart ............................ 340/636 |
| 3,383,580 | A | 5/1968 | Wallace, Jr. .................. 429/92 |
| 3,600,234 | A | 8/1971 | Massie, Jr. ................... 429/92 |
| 3,832,629 | A | 8/1974 | Cernek, Jr. ................... 429/89 |
| 3,891,465 | A | 6/1975 | Muto et al. ................... 429/50 |
| 3,994,175 | A | 11/1976 | Yamaguchi et al. ......... 324/427 |
| 3,996,579 | A | 12/1976 | Dahl ............................ 324/432 |
| 4,052,717 | A | 10/1977 | Arnold et al. ................ 340/636 |
| 4,053,686 | A | 10/1977 | Oxenreider ................... 320/132 |
| 4,184,011 | A | 1/1980 | Strazewski ................... 320/134 |
| 4,217,645 | A | 8/1980 | Barry et al. .................. 702/63 |
| 4,247,811 | A | 1/1981 | Findl ............................ 429/91 |
| 4,284,951 | A | 8/1981 | Dahl et al. ................... 324/430 |
| 4,329,406 | A | 5/1982 | Dahl et al. ................... 429/92 |
| 4,388,584 | A | 6/1983 | Dahl et al. ................... 320/126 |
| 4,562,127 | A | 12/1985 | Mangone ..................... 429/89 |
| 4,625,201 | A | 11/1986 | Berry ....................... 340/636.13 |
| 4,803,459 | A | * | 2/1989 | Ta ............................... 340/459 |
| 4,866,428 | A | 9/1989 | Hinkle ...................... 340/572.1 |
| 4,913,987 | A | 4/1990 | Dattilo ..................... 340/636.1 |
| 4,957,828 | A | 9/1990 | Garron ........................ 429/92 |
| 4,978,592 | A | 12/1990 | Dattilo ........................ 429/89 |
| 4,981,764 | A | 1/1991 | Dattilo ........................ 429/50 |
| 5,099,210 | A | * | 3/1992 | Fortney et al. .............. 324/433 |
| 5,281,919 | A | 1/1994 | Palanisamy ................. 324/427 |
| 5,550,474 | A | 8/1996 | Dahl ............................ 324/432 |
| D399,485  | S | 10/1998 | McMurren ................... 429/91 |
| 5,841,357 | A | 11/1998 | Henry et al. ............ 340/636.13 |
| 5,936,382 | A | 8/1999 | Jones et al. .................. 320/132 |

* cited by examiner

Primary Examiner—N. Le
Assistant Examiner—Vincent Q. Nguyen
(74) Attorney, Agent, or Firm—MacMillan, Sobanski & Todd, LLC; Donald R. Fraser

(57) ABSTRACT

An apparatus for detecting a reduction of a level of electrolyte in a wet cell battery includes an electrically conductive sensing rod in contact with an electrolyte in a battery cell, a voltage comparator connected to the rod for generating a first output signal when an input voltage is greater than a reference voltage and generating a second output signal when an input voltage is less than the reference voltage, and an indicator responsive to the output signals for generating a green visual signal when the rod is immersed in the electrolyte and generating a red visual signal when the rod is not immersed in the electrolyte. The apparatus also include an audio alarm device sounding an audio indication when the red visual signal is generated. A sensing circuit can be connected between the voltage comparator and a pair of battery voltage input terminals to selectively connect the terminals to the comparator when a voltage of a battery connected to the terminals exceeds a predetermined voltage level.

15 Claims, 4 Drawing Sheets

BATTERY ACID LEVEL ALARM

CROSS-REFERENCE TO RELATED APPLICATION

This application claims the benefit of U.S. provisional patent application serial No. 60/274,316, filed Mar. 8, 2001.

BACKGROUND OF THE INVENTION

The present invention relates to an improvement in battery cell monitors in which the reduction of the level of the electrolyte of a wet cell battery below a predetermined level may be detected.

It has long been recognized that evaporation of electrolyte from wet cell atteries is a serious problem that can lead to reduced electrical power output and damage to the cells. Numerous devices have been proposed for monitoring the electrolyte level in, a battery cell. In one such device, a monitor monitors the electrolyte fluid level of individual battery cells on battery powered mobile or stationary equipment. The one piece monitor includes a probe housing with associated circuitry and two wire leads. The monitor wire lends may be permanently or temporarily attached to the battery system voltage and battery system ground. After removing the battery fill cap of a specific cell, the probe is inserted into the fill cap opening on the battery. The monitor's electrolyte level indicator provides an indication that the, electrolyte is at the battery manufacturer's recommended level. If the indicator does not illuminate, water needs to be added to the batteries. However, this device is not mounted in the cell opening, which is desirable for certain installations, and does not discriminate between the indicator not illuminating because the water is low or the indicator is not working.

SUMMARY OF THE INVENTION

The primary purpose of the present invention is to detect the level of electrolyte in a lead acid battery cell. It does so by placing a metal rod in the electrolyte solution, with the rod projecting into the battery cell to the minimum desired depth of electrolyte. While in contact with the electrolyte, current is caused to flow through the rod. When the electrolyte drops below the predetermined level, the contact between the rod and the electrolyte is lost and the current ceases to flow.

In actual practice contact is never really lost because a film of electrolyte is present on all interior surfaces of a battery cell. The film of electrolyte provides a conductive path that simulates contact with the electrolyte bath and produces false readings of electrolyte levels.

The present invention concerns an apparatus for detecting a reduction of a level of electrolyte in a wet cell battery comprising: an electrically conductive sensing rod adapted to be disposed within a cell of a battery in contact with an electrolyte in the cell; a voltage comparator means having an input connected to the rod and having output, the voltage comparator means generating a first output signal when a voltage at the input is greater than a reference voltage and generating a second output signal when a voltage at the input is less than the reference voltage; an indicator means being responsive to the first output signal for generating a green color visual signal and being responsive to the second output signal for generating a red color visual signal; and an audio alarm device connected to the output of the voltage comparator means and being responsive to the second output signal for generating an audio indication whereby when the rod is immersed in the electrolyte, the first visual signal is generated and when the rod is not immersed in the electrolyte, the second visual signal and the audio indication are generated.

The apparatus according to the present invention also can include a sensing means connected between the voltage comparator means and a pair of battery voltage input terminals, the sensing means selectively connecting the terminals to the voltage comparator means when a voltage of a battery connected to the input terminals exceeds a predetermined voltage level, wherein the predetermined voltage level is above a normal operating voltage of the battery and is below a charging voltage generated when the battery is connected to a battery charger.

BRIEF DESCRIPTION OF THE DRAWINGS

The objectives and advantages of the invention will become readily apparent to one skilled in the art from reading the following detailed description of one embodiment of the invention when considered in the light of the accompanying drawing in which.

DETAILED DESCRIPTION OF THE ILLUSTRATED EMBODIMENT

Figure 1:
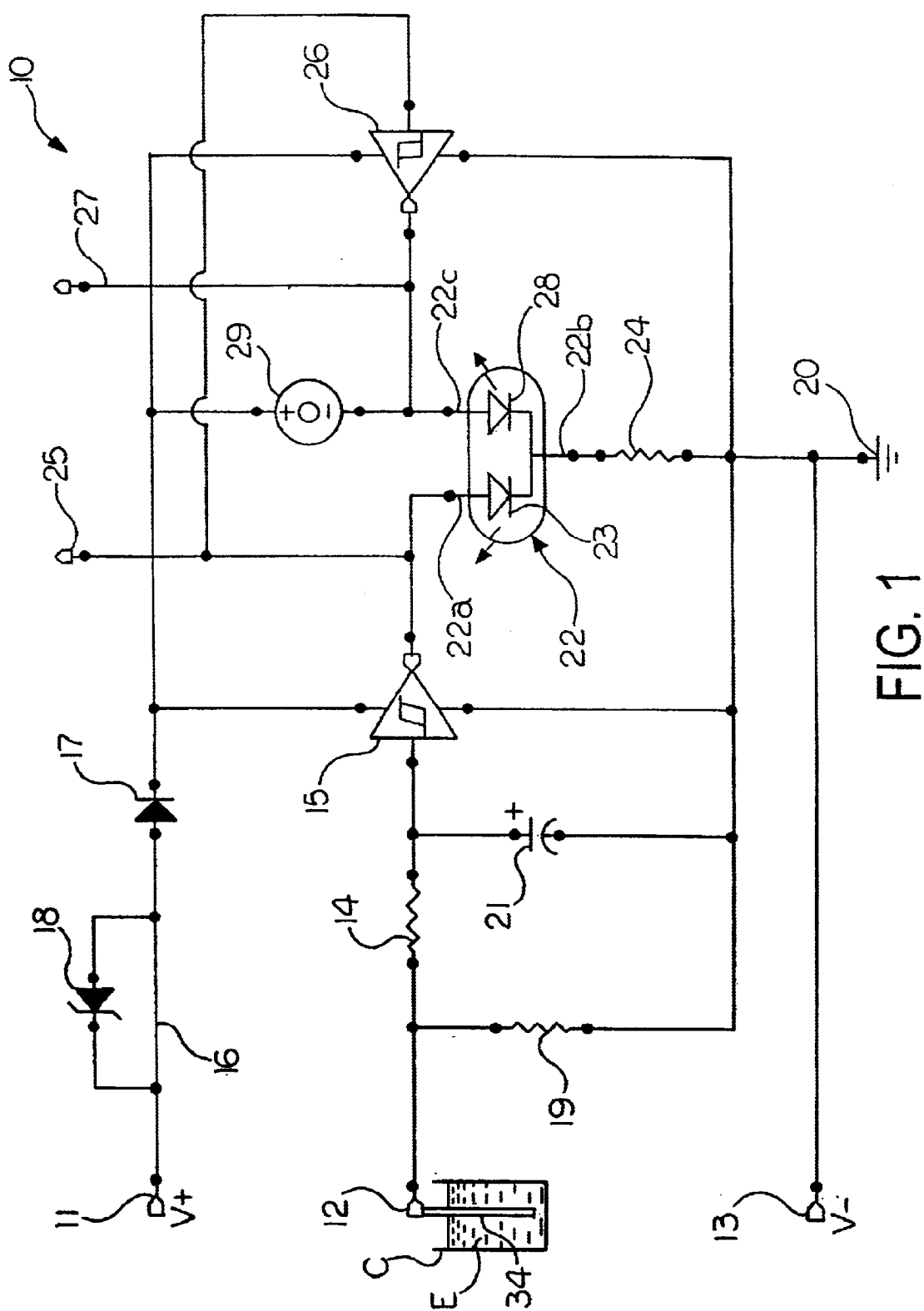
FIG. 1 is a schematic illustration of a battery acid level alarm circuit embodying the features of the present invention.

Referring to FIG. 1 there is illustrated a schematic diagram of a battery acid level alarm circuit 10 having a V+ input terminal 11 for connection to a positive polarity terminal of a battery to be monitored, an INPUT terminal 12 for receiving an input signal and a V− terminal 13 for connection to a negative polarity terminal of the battery. The terminal 12 is connected through a first resistor 14 to an input of a first comparator 15 having hysteresis characteristics. The V+ terminal 11 is connected through a shunt 16 and a diode 17 to a positive reference voltage terminal of the comparator 15. A Zener diode 18 is connected in parallel with the shunt 16. The shunt 16 is disconnected when monitoring a battery having an output voltage above six volts. The INPUT terminal 12 is connected through a second resistor 19 to a negative reference voltage terminal of the comparator, to the V− terminal 13 and to a circuit ground 20. A capacitor 21 is connected between the input to the comparator 15 and the negative reference voltage terminal of the comparator.

An output of the comparator 15 is connected to a first input 22a of a visual indicator 22 that includes a first light emitting diode (LED) 23 emitting a red light. An output 22b of the indicator 22 is connected through a third resistor 24 to the ground 20. The output of the comparator 15 is connected to a first relay terminal 25 and to an input of a second comparator 26 having hysteresis characteristics. The second comparator 26 is connected to the V+ terminal 11 and the V− terminal 13 in the same manner as the first comparator 15. An output of the second comparator 26 is connected to a second relay terminal 27 and to a second input 22c of the visual indicator 22 that includes a second LED 28 emitting a green light. The output of the second comparator 26 also is connected to a negative polarity terminal of an audio alarm device or transducer 29 having a positive polarity terminal connected to the positive reference terminal of the comparator 26.

The circuit 10 operates to discriminate between a truly closed circuit (contact with the electrolyte bath) and leakage current caused by the ever-present film of electrolyte inside a battery cell. A current flow through an electrically conductive sensing rod electrically connected to the INPUT terminal 12 and the resistor 19 develops a positive polarity voltage at the input to the first comparator 15. The comparators 15 and 26 have two output states. If the input voltage is below a threshold voltage, the comparator generates a high state output signal. If the input voltage is above a threshold voltage, the comparator generates a low state output signal. If the voltage sensed at the INPUT terminal 12 is above a predetermined threshold, contact with the electrolyte bath is indicated and the first comparator 15 generates the low state output signal that will not illuminate the red LED 23. The low state output signal is the input to the second comparator 26 which generates the high state output signal to cause the green LED 28 to be illuminated and to prevent activation of the audio alarm device 29. If the sensed voltage is below the threshold, the first comparator 15 generates the high state output signal to cause the red LED 23 to be illuminated. The second comparator 26 then generates the low state output signal to turn off the green LED 28 and to activate the audio alarm device 29. The hysteresis within the comparators 15 and 26 ensures a clear distinction of threshold level.

In instances where the electrolyte is set in motion, such as when the battery being monitored is installed in a vehicle, momentary breaks in contact with the sensing rod may occur that would trigger the alarm device 29. To prevent annoying alarm 'chirps', a delay circuit is formed by the resistor 14 and the capacitor 21 to filter out the momentary disruptions by averaging the signal at the INPUT terminal 12.

The diode 17 protects the circuit in the event the connections of the terminals 11 and 13 to the battery are reversed. Without the diode 17, large currents would pass through the comparator 15 via its internal substrate diode and both damage the comparator and possibly melt one or both of the lead wires.

Figure 2:
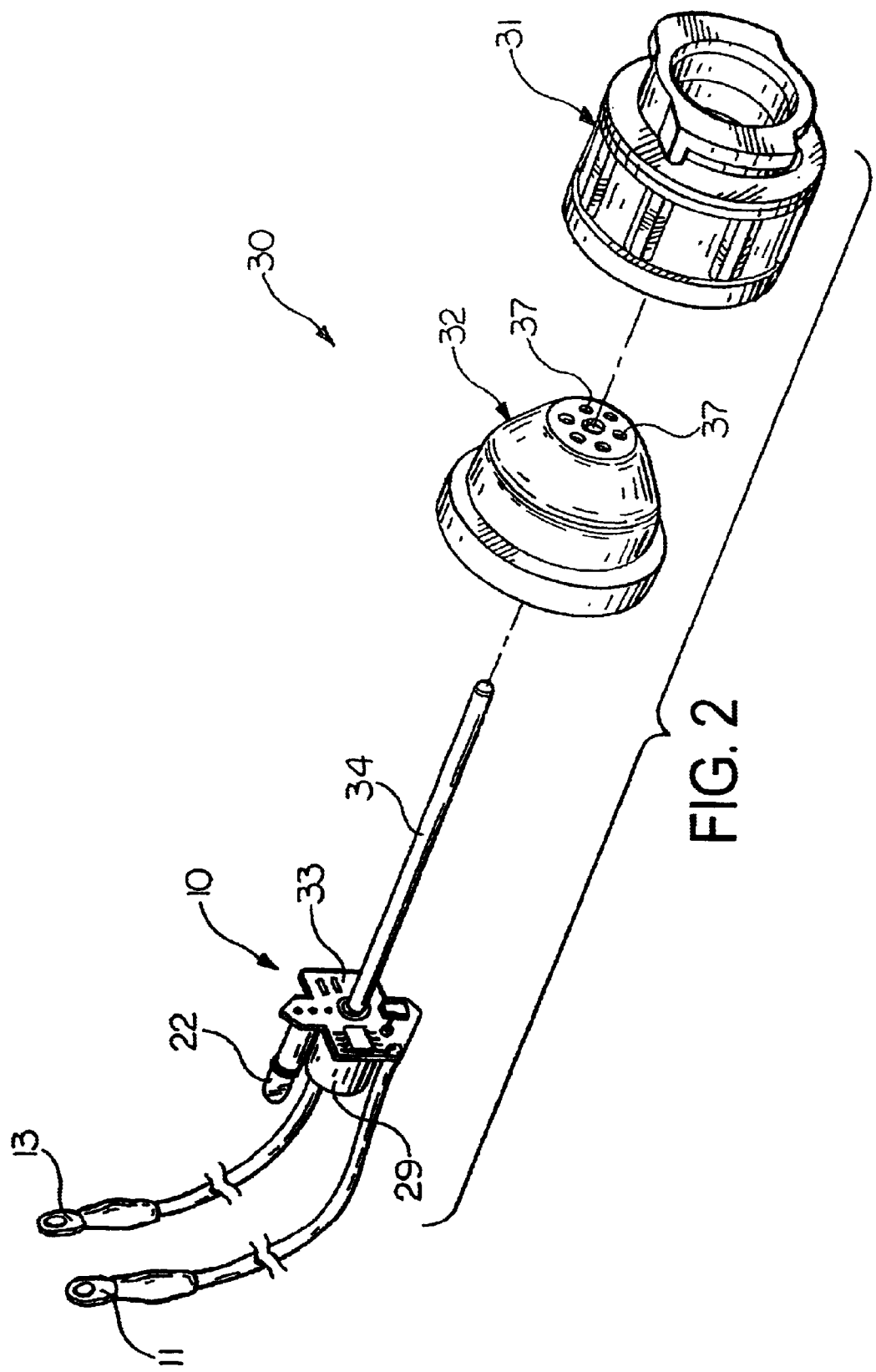
FIG. 2 is an exploded perspective view of a battery acid level alarm incorporating the circuitry illustrated in FIG. 1.
Figure 3:
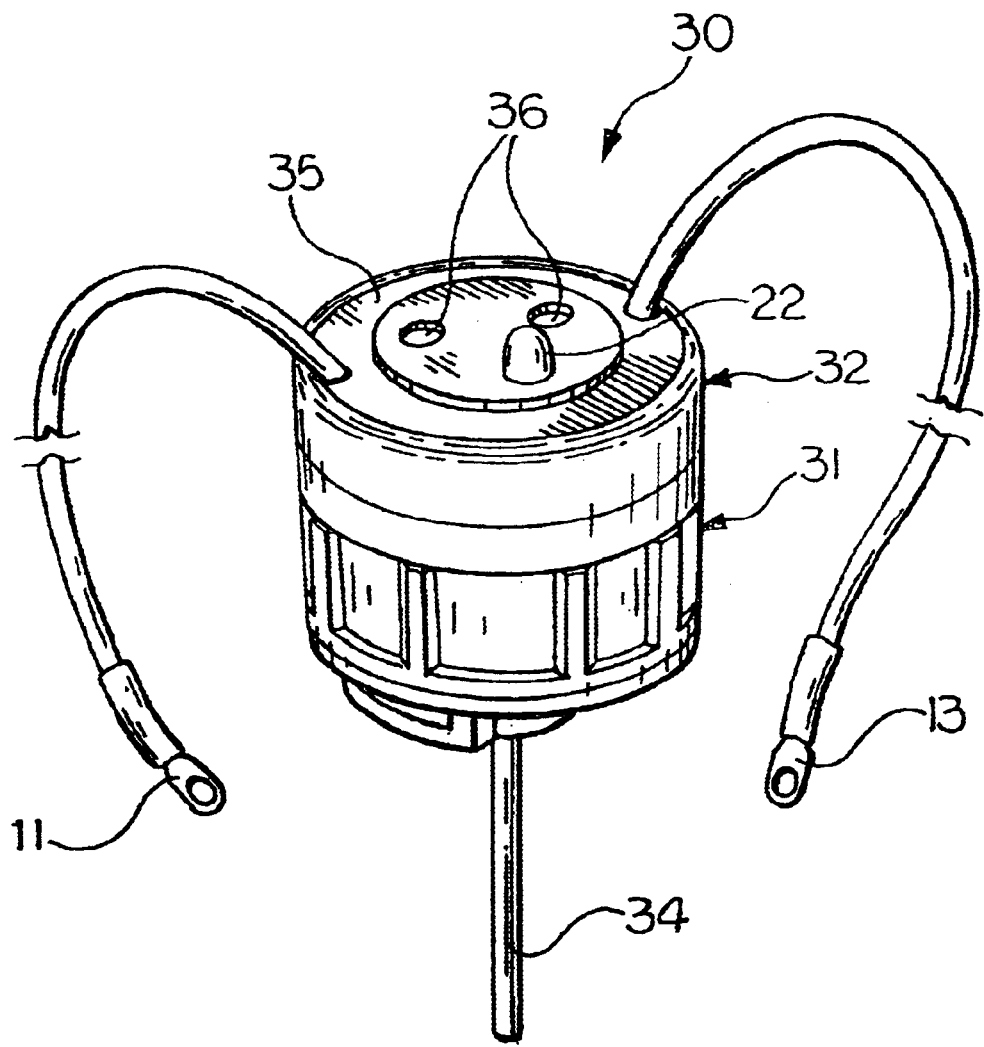
FIG. 3 is a perspective view of the battery acid level alarm illustrated in FIG. 2 assembled.

FIGS. 2 and 3 illustrate a physical embodiment of a battery acid level alarm apparatus 30 according to the present invention to be connected to appropriate terminals of an associated battery (not shown). The alarm apparatus 30 includes a cap shell 31 of the screw cap type shown for illustrative purposes. The cap shell 31 can be of any suitable configuration required to replace the standard cap or cover for the cell of the battery to be monitored. A cup-shaped circuit housing 32 receives the electronic components of the circuit 10 shown in FIG. 1 mounted on a circuit board 33. Depending downwardly from the circuit board 33 is a probe member 34 that is connected to the INPUT terminal 12 of FIG. 1. The probe or rod 34 is shown immersed in electrolyte E in a battery cell C. The terminals 11 and 13 terminate electrical conductors to be coupled to appropriate positive V+ and negative V− terminals of the battery. The housing 32 is closed at an upper end by a cover 35 through which the indicator 22 extends. Also the cover 35 is provided with openings 36 for sound generated by the audio alarm device 29.

When monitoring batteries in remotely located equipment, such as microwave repeaters, cell phone transceivers, or power grid switching stations where personnel are seldom in attendance, it is desirable to have a means of communicating battery status to distant operators. Typically this is accomplished by means of an associated phone line or radio link and is activated through a relay or electro-optically coupled control device. The circuit 10 according to the present invention provides the two outputs 25 and 27 to drive such devices with the output signals from the comparators 15 and 26 respectively.

When batteries combine several lead acid cells into one unit, as is the case with automobile batteries, a means of reducing the positive supply voltage, V+, is required. The Zener diode 18 performs this function when the shunt 16 is removed.

Current state of the art battery indicator designs employ a single color status indicator light, typically red in color. The light may be either 'on' or 'off' when indicating trouble, depending upon the design of the individual unit. In either case, interpretation of the indicator can be ambiguous and lead to false conclusions, resulting in a damaged battery.

Additionally, with 'off' being one of the valid indication modes, a damaged or inoperative unit can give a false or misleading indication. The user can not differentiate between a valid indication and an inoperative unit without further investigation.

If the red light 'on' indicates trouble (a natural interpretation), then 'off' means 'OK'. But a disconnected, damaged or otherwise inoperative unit will also be 'off' and thus will imply that the battery is OK when in fact the battery's condition is completely unknown.

Conversely, if the red light 'on' indicates the battery is 'OK' (a non-intuitive and confusing signal) and 'off' means trouble, then a damaged or inoperative unit will indicate trouble when, again, the actual battery condition is unknown.

By using two, naturally intuitive colors for status indication by the indicator 22, the battery condition can be unmistakably determined at a glance. A lack of indication (no light) declares that the unit is inoperative.

Integral visual indicators become ineffective when the batteries being monitored are enclosed, covered or in some other way out of sight, as is common in most applications. While several presently available battery monitoring devices incorporate an audio alarm, none are built into the sensing unit itself. Doing so offers two improvements over current designs:

First: The wiring between a sensor and a remote annunciator can be broken, pinched or pierced, disrupting the alarm signal and preventing the annunciator from performing its function. Placing an annunciator within the sensor body prevents this kind of system failure.

Second: Mounting an annunciator away from the battery, on a vehicle dashboard for example, required the ability to interpret an icon or reading skills in a specific language to determine the nature of the problem. Having an audible alarm located on the battery itself gives a clear and unambiguous indication of what and where the problem lies.

The alarm 30 according to the present invention employs flexible wires for installation. Because lead acid batteries can store and deliver large amounts of energy, a potential fire hazard exists from the possibility of a wire becoming cut, abraded or pierced during the life of the device. For this reason all external connections use small diameter wire. In the event of a high current surge, caused by wire damage, the current will melt the wire and open the circuit in the same manner as a fuse would thus preventing a fire.

Vent holes 37 are provided in the sensor body to prevent the built up of explosive gasses within the lead acid cell being monitored. Without these, hydrogen and oxygen, liberated in the charging process, could accumulate dangerous levels within the battery cell. These gases pass through the interior of the circuit housing 32 and out through the sound openings 36.

The integral audio annunciator 29, enclosed within the body of the sensor, requires acoustic venting to achieve the highest audible volumes. The cover cap 35 for the sensor provides the two sound ports 36, offset from the output port (not shown) of the audio transducer. The offset prevents the introduction of liquids or foreign matter into the transducer.

Batteries are often sprayed with water to remove electrolyte, typically sulfuric acid, from the outer surfaces of the battery. Water, which enters the body of the housing 32, is drained via one or more holes (not shown) located in the sidewall of the body of the sensor. Without these, accumulated water would reduce the sound level of the audio transducer, and in extreme cases prevent it from operating altogether.

In the event of the electrolyte falling below the alarm level during working operation it would be very inconvenient to pull the vehicle out of service immediately. It would be irritating to the operator to have the alarm buzzer sounding off in his ear.

To eliminate the problem, the alarm 30 is equipped with an optional "Audio Kill Circuit" which the operator can initiate at the push of a button. The alarm circuit is automatically reset when the vehicle key switch is turned off. When the vehicle key switch is again turned on the audio alarm will again sound unless the electrolyte level has been corrected.

Figure 4:
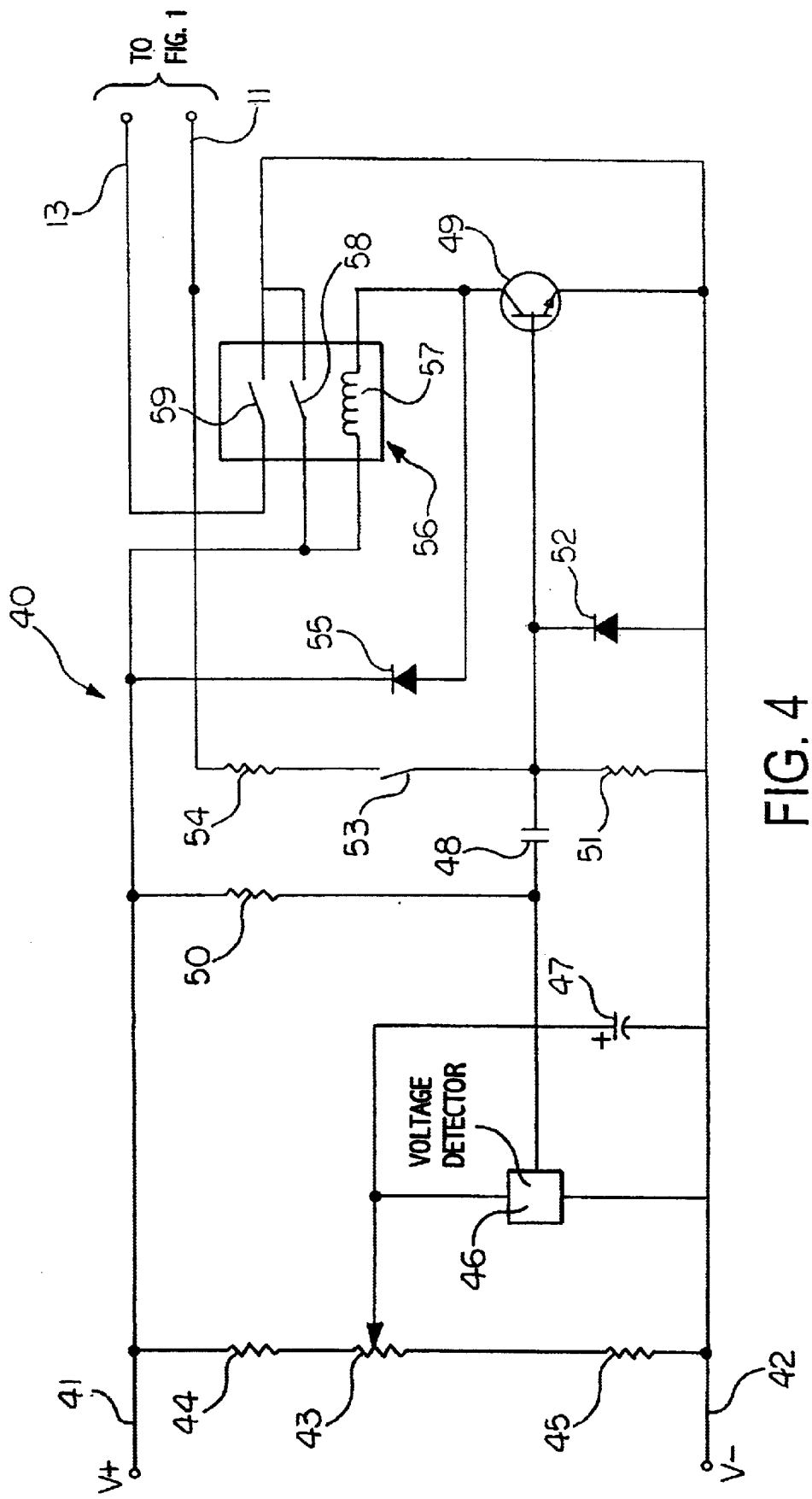
FIG. 4 is a schematic illustration of an optional voltage sensing circuit used in conjunction with the battery acid level alarm circuit shown in FIG. 1.

An optional voltage sensing circuit 40, shown in schematic form in FIG. 4, can be set to trigger the detection of the electrolyte level only at a time when the battery is connected to a battery charger. The engaging of the trigger action means that the level alarm 30 is not active during normal operation of the vehicle. When the vehicle is brought to the charging station for recharging, the battery is connected to the charger and the battery acid level alarm circuit 10 automatically becomes active.

The sensing circuit 40 has a pair of input terminals 41 and 42 for connection to the V+ and V− outputs of a battery (not shown). A variable resistor 43 is connected between two resistors 44 and 45 in series across the terminals 41 and 42. A contact of the resistor 43 is connected to an input of a voltage detector 46 and through a capacitor 47 to the V− terminal 42. A ground of the detector 46 is connected to the V− terminal 42. An output of the detector 46 is connected through a capacitor 48 to a base of a NPN transistor 49 and is connected through a resistor 50 to the V+ terminal 41. A resistor 51 and a diode 52 are connected in parallel between the base of the transistor 49 and the V− terminal 42. A single throw switch 53 and a resistor 54 are connected in series between the base of the transistor 49 and the V+ terminal 11 of FIG. 1. A collector of the transistor 49 is connected to the V+ terminal 41 through a diode 55 and an emitter is connected to the V− terminal 42. A double pole, single throw relay 56 has a relay coil 57 connected between the V+ terminal 41 and the collector of the transistor 49. A first switch 58 of the relay 56 is connected between the V+ terminal 41 and the V+ terminal 11. A second switch 59 of the relay 56 is connected between the V− terminal 42 and the V− terminal 13.

As shown in FIG. 4, the battery is not connected to the battery charger or the battery charger is not turned on so that the transistor 49 is turned off and the relay switches 58 and 59 are open. When the battery is connected to the operating charger, the voltage of the battery rises well above its normal operating level at the terminals 41 and 42. The voltage detector 46 is set to detect this condition and turn on the transistor 49. Current flows through the relay coil 57 to close the switches 58 and 59 thereby activating the alarm circuit 10 to sense the electrolyte level. The purpose is to automatically prevent the annoyance of the audio alarm 29 sounding off during normal operation of the vehicle.

In accordance with the provisions of the patent statutes, the present invention has been described in what is considered to represent its preferred embodiment. However, it should be understood that the invention can be practiced otherwise than as specifically illustrated and described without departing from its spirit or scope.

What is claimed is:

1. An apparatus for detecting a reduction of a level of electrolyte in a wet cell battery comprising:

an electrically conductive sensing rod adapted to be disposed within a cell of a battery in contact with an electrolyte in the cell;

a voltage comparator means having an input connected to said rod and having output, said voltage comparator means generating a first output signal when a voltage at said input is greater than a reference voltage and generating a second output signal when a voltage at said input is less than the reference voltage;

an indicator means being responsive to said first output signal for generating a first visual signal and being responsive to said second output signal for generating a second visual signal whereby when said rod is immersed in the electrolyte, said first visual signal is generated and when said rod is not immersed in the electrolyte, said second visual signal is generated;

a circuit housing enclosing said voltage comparator means and said indicator means, said circuit housing being generally cup-shaped with an open end closed by a cover; and an audio alarm device connected to said output of said voltage comparator means and being responsive to said second output signal for generating an audio indication, said audio alarm device being positioned in said circuit housing and said cover having at least one sound opening formed therein.

2. The apparatus according to claim 1 wherein said first visual signal is a green color light and said second visual signal is a red color light.

3. The apparatus according to claim 1 wherein said voltage comparator means includes a first comparator having hysteresis characteristics with an input connected to said rod and an output for generating said second output signal.

4. The apparatus according to claim 3 wherein said voltage comparator means includes a second comparator having hysteresis characteristics with an input connected to said output of said first comparator and an output for generating said first output signal.

5. The apparatus according to claim 1 including a cap shell attached to said circuit housing and adapted to be mounted in an opening of the cell.

6. The apparatus according to claim 1 wherein said indicator means extends through said cover.

7. The apparatus according to claim 1 including a sensing means connected between said voltage comparator means and a pair of battery voltage input terminals, said sensing means selectively connecting said terminals to said voltage comparator means when a voltage of a battery connected to said input terminals exceeds a predetermined voltage level.

8. The apparatus according to claim 7 wherein said predetermined voltage level is above a normal operating voltage of the battery and is below a charging voltage generated when the battery is connected to a battery charger.

9. An apparatus for detecting a reduction of a level of electrolyte in a wet cell battery comprising:

an electrically conductive sensing rod adapted to be disposed within a cell of a battery in contact with an electrolyte in the cell;

a voltage comparator means having an input connected to said rod and having output, said voltage comparator means generating a first output signal when a voltage at said input is greater than a reference voltage and generating a second output signal when a voltage at said input is less than the reference voltage;

an indicator means being responsive to said first output signal for generating a green color visual signal and being responsive to said second output signal for generating a red color visual signal;

an audio alarm device connected to said output of said voltage comparator means and being responsive to said second output signal for generating an audio indication whereby when said rod is immersed in the electrolyte, said first visual signal is generated and when said rod is not immersed in the electrolyte, said second visual signal and said audio indication are generated;

a sensing means connected between said voltage comparator means and a pair of battery voltage input terminals, said sensing means selectively connecting said terminals to said voltage comparator means when a voltage of a battery connected to said input terminals exceeds a predetermined voltage level, wherein said predetermined voltage level is above a normal operating voltage of the battery and is below a charging voltage generated when the battery is connected to a battery charger.

10. An apparatus for detecting a reduction of a level of electrolyte in a wet cell battery comprising:

an electrically conductive sensing rod adapted to be disposed within a cell of a battery in contact with an electrolyte in the cell;

a voltage comparator means having an input connected to said rod and having output, said voltage comparator means generating a first output signal when a voltage at said input is greater than a reference voltage and generating a second output signal when a voltage at said input is less than the reference voltage;

an indicator means being responsive to said first output signal for generating a first visual signal and being responsive to said second output signal for generating a second visual signal whereby when said rod is immersed in the electrolyte, said first visual signal is generated and when said rod is not immersed in the electrolyte, said second visual signal is generated;

a generally cup-shaped circuit housing enclosing said voltage comparator means and said indicator means and having an open end;

a cap shell attached to said circuit housing and adapted to be mounted in an opening of the cell; and a cover closing said open end of said circuit housing, said indicator means extending through said cover.

11. The apparatus according to claim 10 wherein said first visual signal is a green color light and said second visual signal is a red color light.

12. The apparatus according claim 10 including an audio alarm device connected to said output of said voltage comparator means and being responsive to said second output signal for generating an audio indication.

13. The apparatus according to claim 10 wherein said voltage comparator means includes a first comparator having hysteresis characteristics with an input connected to said rod and an output for generating said second output signal and a second comparator having hysteresis characteristics with an input connected to said output of said first comparator and an output for generating said first output signal.

14. The apparatus according to claim 10 including a sensing means connected between said voltage comparator means and a pair of battery voltage input terminals, said sensing means selectively connecting said terminals to said voltage comparator means when a voltage of a battery connected to said input terminals exceeds a predetermined voltage level.

15. The apparatus according to claim 14 wherein said predetermined voltage level is above a normal operating voltage of the battery and is below a charging voltage generated when the battery is connected to a battery charger.

* * * * *